(12) United States Patent
Klimpel

(10) Patent No.: US 12,424,802 B2
(45) Date of Patent: *Sep. 23, 2025

(54) TECHNIQUE FOR PREVENTING ARCING WHEN DISCONNECTING A DC CONNECTION BY USING AN EXTENSION OF A LINE COMPOUND

(71) Applicant: Phoenix Contact GmbH & Co. KG, Blomberg (DE)

(72) Inventor: Marc Klimpel, Lage (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 621 days.

This patent is subject to a terminal disclaimer.

(21) Appl. No.: 17/786,542

(22) PCT Filed: Dec. 16, 2020

(86) PCT No.: PCT/EP2020/086514
§ 371 (c)(1),
(2) Date: Feb. 1, 2023

(87) PCT Pub. No.: WO2021/122812
PCT Pub. Date: Jun. 24, 2021

(65) Prior Publication Data
US 2023/0178941 A1  Jun. 8, 2023

(30) Foreign Application Priority Data

Dec. 19, 2019 (DE) ...................... 10 2019 135 122.7

(51) Int. Cl.
*H01R 13/703* (2006.01)
*H01R 13/648* (2006.01)

(52) U.S. Cl.
CPC ..... *H01R 13/7038* (2013.01); *H01R 13/6485* (2013.01)

(58) Field of Classification Search
CPC ................................................. H01R 13/1038
(Continued)

(56) References Cited

U.S. PATENT DOCUMENTS

2014/0154904 A1  6/2014  Strobl et al.
2016/0294125 A1* 10/2016  Hsu .................... H01R 13/7038
(Continued)

FOREIGN PATENT DOCUMENTS

DE           10253749 A1   6/2004
DE      102007043512 A1   3/2009
(Continued)

*Primary Examiner* — Joseph Chang
(74) *Attorney, Agent, or Firm* — LEYDIG, VOIT & MAYER, LTD.

(57) ABSTRACT

A plug-in contact device for preventing or extinguishing an arc when a DC connection is disconnected or closed by using an extension of a line compound includes: at least two connectors at ends of an extension of a line compound, each having a main contact (HA) and an auxiliary contact (HI), the HA of each of the at least two connectors having a first contact half (HA1) and a second contact half (HA2), which are detachably intermateable, the HA: connecting the HA1 and the HA2 in an electrically conductive manner in a mated state of the respective connector, galvanically isolating the HA1 and the HA2 in an unmated state of the respective connector, connecting the HA1 and the HA2 in an electrically conductive manner in a first intermediate state of the respective connector between the mated state and the unmated state, and galvanically isolating the HA1 and the HA2.

22 Claims, 5 Drawing Sheets

(58) Field of Classification Search
USPC .......................................................... 307/99
See application file for complete search history.

(56) References Cited

U.S. PATENT DOCUMENTS

| | | |
|---|---|---|
| 2017/0288348 A1 | 10/2017 | Pohl et al. |
| 2018/0006447 A1 | 1/2018 | Morita |
| 2020/0244015 A1* | 7/2020 | Henke .................... H01H 50/44 |

FOREIGN PATENT DOCUMENTS

| | | |
|---|---|---|
| DE | 102012008614 A1 | 10/2013 |
| DE | 102015224268 A1 | 6/2016 |
| EP | 2742565 B1 | 3/2017 |
| FR | 3054936 A1 | 2/2018 |

\* cited by examiner

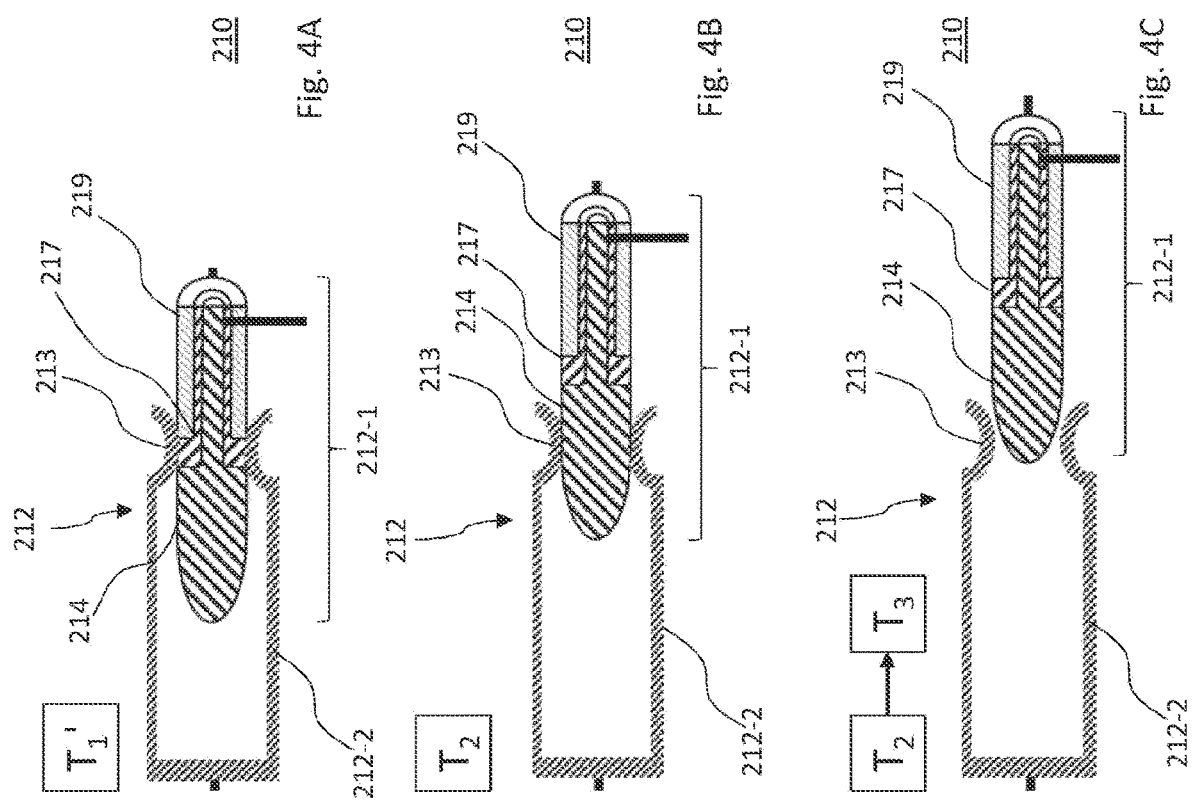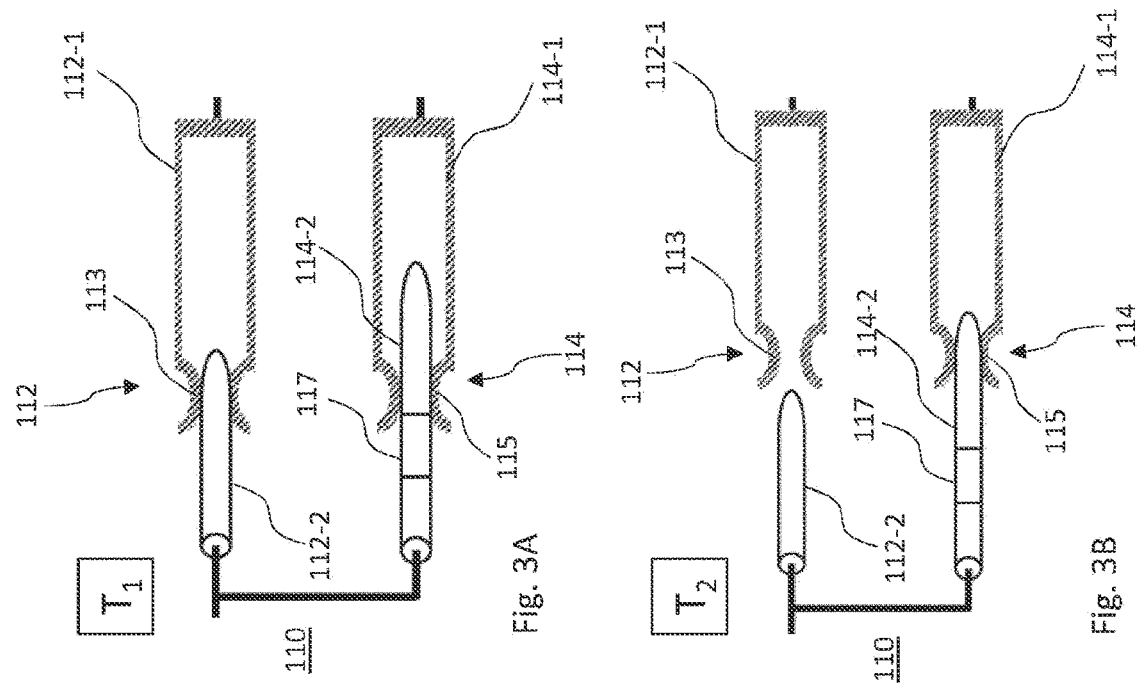

TECHNIQUE FOR PREVENTING ARCING WHEN DISCONNECTING A DC CONNECTION BY USING AN EXTENSION OF A LINE COMPOUND

CROSS-REFERENCE TO PRIOR APPLICATIONS

This application is a U.S. National Phase application under 35 U.S.C. § 371 of International Application No. PCT/EP2020/086514, filed on Dec. 16, 2020, and claims benefit to German Patent Application No. DE 10 2019 135 122.7, filed on Dec. 19, 2019. The International Application was published in German on Jun. 24, 2021 as WO/2021/122812 under PCT Article 21(2).

FIELD

The invention relates to a technique, in particular a plug-in contact device, for preventing or extinguishing an arc when a DC connection is disconnected or closed by using an extension of a line compound.

BACKGROUND

When disconnecting or closing a direct current (DC) connection, unlike an alternating current (AC application), increasing arcing is to be expected. This is a particular challenge for connectors. On the one hand, arcing leads to damage at the connector, both to housing parts and to the contacts. On the other hand, arcing also poses a danger to the operator.

There are different concepts for extinguishing the arc with mechanical aids, such as sacrificial zones, or by means of a magnet known as a blow magnet (due to the Lorentz force acting on the plasma of the arc) or due to a speed of contact disconnection.

Another alternative is electronic spark extinguishing (or spark quenching). Here, arcing is suppressed with the help of electronic components. The principle can be compared to an electronic switch. As with a mechanical switch, the circuit is interrupted. However, since no physical contact is opened, no arcing occurs. The circuit is interrupted by means of electronic components. Semiconductor components such as bipolar transistors with insulated gate electrodes (IGBTs), metal oxide semiconductor field-effect transistors (MOS-FETs) or varistors thereby shift the switching power to the electronic modules and the contacts are thus protected. Such technologies are described, for example, in EP 2 742 565 B1, US 2018/0006447 A1, DE000020253749A1 and DE10 2007 043 512 A1.

In normal operation, the current flows either permanently via the electronics, which continuously generates power loss, or during the switching process, the current flow is briefly conducted via the electronics and switched off, which is significantly better in terms of energy. In this case, an additional auxiliary contact is required, which is parallel to one of the load contacts and enables the current flow via the electronics. These variants, as described for example in EP 2 742 565 B1 and US 2018/0006447 A1, may be integrated into a connector housing, as well as located in a connector strip or in a control cabinet. The latter described central placement of the electronics in a connector strip or in a control cabinet has the advantage that any number of connectors may be operated with one module. As described, for example, in document EP 2 742 565 B1, corresponding diodes must then be installed in the supply lines to each of the auxiliary contacts, so that no short circuit occurs between various different lines of a plurality of connectors and only the current of the currently switching line (or connector to be disconnected or connected) flows via the electronics.

By means of the diodes described in the document EP 2 742 565 B1, a plurality of connectors may be supplied in parallel with a single electronic module, however this only works for unidirectional networks. A special feature of DC networks is that energy flows may be bidirectional, as is the case, for example, with accumulators (secondary cells), which may be both a source, as well as a consumer of the direct current. Similarly, electric machines may work as consumers of the direct current, but also feed energy back as a generator during braking. In a bidirectional application, for example the change between motor and generator operation of an electric machine, the described diode circuit does not work. Here, a more complex circuit of each individual auxiliary contact would have to be implemented with significant additional expense.

A disadvantage in the known prior art is that the electronics can only supply one connector per line, and only the first connector behind the electronics. However, it is often the case in applications that a plurality of connectors are connected in series. For example, a multiple socket can be plugged into a wall socket. Additional devices can then be plugged into the multiple socket, some of which may also be disconnected directly at the device by means of an additional plug. For example, an IEC connector may be installed on the unit itself. It is therefore not unusual for a plurality of connectors to be connected in series. A multitude of serial connections may thus be created by extensions of a line compound and branching. A connection of additional connectors, which are arranged in series from the extinguishing electronics behind the first connector, to the extinguishing electronics, is not provided by the prior art. If one of the other connectors is disconnected, the extinguishing electronics can therefore neither prevent nor extinguish arcing.

SUMMARY

In an embodiment, the present invention provides a plug-in contact device for preventing or extinguishing an arc when a DC connection is disconnected or closed by using an extension of a line compound, comprising: at least two connectors at ends of an extension of a line compound, each having a main contact (HA) and an auxiliary contact (HI), the HA of each of the at least two connectors comprising a first contact half (HA1) and a second contact half (HA2), which are detachably intermateable, the HA being configured to: connect the HA1 and the HA2 in an electrically conductive manner in a mated state of the respective connector, galvanically isolate the HA1 and the HA2 in an unmated state of the respective connector, connect the HA1 and the HA2 in an electrically conductive manner in a first intermediate state of the respective connector between the mated state and the unmated state, and galvanically isolate the HA1 and the HA2 in a second intermediate state of the respective connector between the first intermediate state and the unmated state, wherein the auxiliary contact HI of each of the at least two connectors comprises a first contact half (HI1) and a second contact half (HI2), which are detachably intermateable, the HI being configured to: galvanically isolate the HI1 and the HI2 in the mated state of the respective connector, galvanically isolate the HI1 and the HI2 in the unmated state of the respective connector, connect the HI1 and the HI2 in an electrically conductive manner in the first intermediate state of the respective connector, and connect the HI1 and the HI2 in an electrically conductive manner in the second intermediate state of the respective connector, wherein the HA2 and the HI2 of the respective connector are connected in an electrically conductive manner, wherein the HA2 of a first connector is connected to the HA1 of a second connector in an electrically conductive manner, further comprising an electronic switching unit, whose first terminal is connected in an electrically conductive manner to the HA1 of the first connector, and whose second terminal is connected in an electrically conductive manner to the HI1 of the first connector and of the second connector, wherein the electronic switching unit is configured, in response to a transition from the mated state to the first intermediate state of at least one of the connectors, to connect the first terminal and the second terminal in an electrically conductive manner, or to reduce an impedance between the first terminal and the second terminal, and, in response to a transition from the first intermediate state to the second intermediate state of at least one of the connectors and/or from the second intermediate state to the unmated state of at least one of the connectors, to electrically isolate the first terminal and the second terminal, or to increase an impedance between the first terminal and the second terminal.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIGS. 3A and 3B an exemplary disconnection process of an embodiment of the plug-in contact device from FIGS. 1A and 1B;

FIG. 4A to 4C an exemplary disconnection process of an embodiment of the plug-in contact device from FIGS. 2A and 2B;

DETAILED DESCRIPTION

Figure 1A:
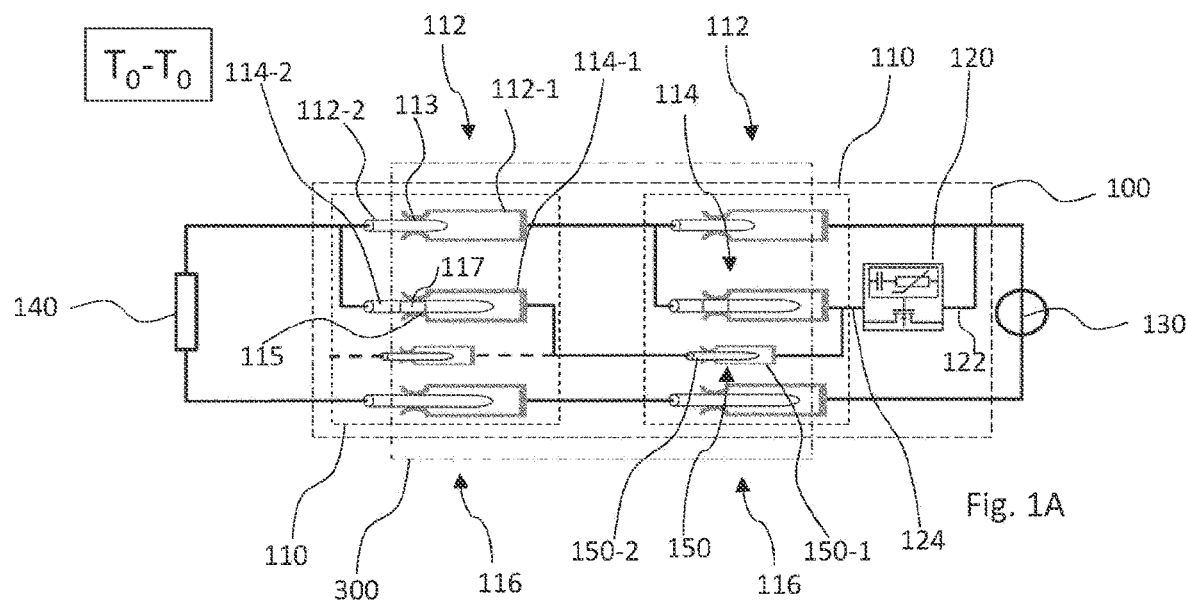
FIGS. 1A and 1B two embodiments of a plug-in contact device having a main contact, an auxiliary contact, an electronic switching unit and an extension of a line compound according to the first aspect.

In an embodiment, the present invention provides a technique for preventing or extinguishing an arc when disconnecting or closing a DC connection by using an extension of a line compound or a series connection of connectors, which may be operated in a unidirectional as well as in a bidirectional network.

Embodiments of the invention, with partial reference to the figures, are provided below.

According to a first aspect, a plug-in contact device is provided for preventing or extinguishing an arc when a DC connection is disconnected or closed by using an extension of a line compound. The plug-in contact device comprises at least two connectors at the ends of an extension of a line compound, each having a main contact (HA) and an auxiliary contact (HI). The HA of each of the at least two connectors comprises a first contact half (HA1) and a second contact half (HA2) which are detachably intermateable. The HA of each of the at least two connectors is designed to connect the HA1 and the HA2 in an electrically conductive manner when the respective connector is in a mated state ($T_0$). The HA of each of the at least two connectors is further designed to galvanically isolate the HA1 and the HA2 when the respective connector is in an unmated state ($T_3$). Furthermore, the HA of each of the at least two connectors is designed to connect the HA1 and the HA2 in an electrically conductive manner when the respective conductor is in a first intermediate state ($T_1$) between the mated state ($T_0$) and the unmated state. Furthermore, the HA of each of the at least two connectors is designed to galvanically isolate the HA1 and the HA2 when the respective conductor is in a second intermediate state ($T_2$) between the first intermediate state ($T_1$) and the unmated state. The auxiliary contact (HI) of each of the at least two connectors comprises a first contact half (HI1) and a second contact half (HI2) which are detachably intermateable. The HI of each of the at least two connectors is designed to galvanically isolate the HI1 and the HI2 when the respective connector is in the mated state ($T_0$). The HA of each of the at least two connectors is further designed to galvanically isolate the HI1 and the HI2 when the respective connector is in the unmated state ($T_3$). Furthermore, the HA of each of the at least two connectors is designed to connect the HI1 and the HI2 in an electrically conductive manner when the respective connector is in the first intermediate state ($T_1$). Furthermore, the HA of each of the at least two connectors is designed to connect the HI1 and the HI2 in an electrically conductive manner when the respective connector is in the second intermediate state ($T_2$). Here, the HA2 and the HI2 of the respective connector are connected in an electrically conductive manner. Furthermore, the HA2 of a first connector is connected to the HA1 of a second connector in an electrically conductive manner.

The plug-in contact device further comprises an electronic switching unit whose first terminal is connected in an electrically conductive manner to the HA1 of the first connector, and whose second terminal is connected in an electrically conductive manner to the HI1 of the first connector and to the HI1 of the second connector. The electronic switching unit is designed, in response to a transition of one of the at least two connectors from the mated state ($T_0$) to the first intermediate state ($T_1$) of at least one of the connectors, to connect at least the first terminal and the second terminal in an electrically conductive manner, or to reduce an impedance between the first terminal and the second terminal. The electronic switching unit is further designed, in response to a transition of one of the at least two connectors from the first intermediate state ($T_1$) to the second intermediate state ($T_2$) of at least one of the connectors and/or from the second intermediate state ($T_2$) to the unmated state of at least one of the connectors, to electrically isolate the first terminal and the second terminal, or to increase an impedance between the first terminal and the second terminal.

In an embodiment of the plug-in contact device according to the first aspect, the HA of each connector can connect the HA1 and the HA2 in an electrically conductive manner in the mated state, while the HI of each connector can galvanically isolate the HI1 and the HI2 in the mated state. In the unmated state, the HA1 and the HA2 as well as the HI1 and the HI2 may each be galvanically isolated. In the first intermediate state of a connector between $T_0$ and $T_3$, the HA1 and the HA2 as well as the HI1 and the HI2 may each be connected in an electrically conductive manner. In the second intermediate state of the connector between $T_1$ and $T_3$, the HA1 and the HA2 may be galvanically isolated, while the HA2 and the HI2 may be connected in an electrically conductive manner.

According to the first aspect, the HA may also be referred to as a load contact.

According to a second aspect, a plug-in contact device is provided for preventing or extinguishing an arc when a DC connection is disconnected or closed by using an extension of a line compound. The plug-in contact device comprises at least two connectors at the ends of an extension of a line compound, each having a main contact (HA). The HA of each connector comprises a first contact half (HA1) and a second contact half (HA2) which are detachably intermateable. The HA1 comprises a load contact section (LA1), an isolating section (TA1) and an auxiliary contact section (HI1). The HA of each of the at least two connectors is designed to connect the LA1 and the HA2 in an electrically conductive manner when the respective connector is in a mated state ($T_0$) and to galvanically isolate the HI1 from the HA2. The HA of each of the at least two connectors is further designed to galvanically isolate the LA1 and HI1 from the HA2 when the respective connector is in an unmated state ($T_3$). Furthermore, the HA of each of the at least two connectors is designed to galvanically isolate the LA1 and the HA2 when the respective conductor is in a first intermediate state ($T_1$) between the mated state ($T_0$) and the unmated state ($T_3$) and to bring at least the TA1 into contact with one contact point of the HA2. Furthermore, the HA of each of the at least two connectors is designed to connect the HI1 to the HA2 in an electrically conductive manner and to galvanically isolate the LA1 and the HA2 when the respective conductor is in a second intermediate state ($T_2$) between the first intermediate state ($T_1$) and the unmated state ($T_3$). The HA2 of a first connector is connected to the HA1 of a second connector in an electrically conductive manner.

The plug-in contact device further comprises an electronic switching unit whose first terminal is connected in an electrically conductive manner to the LA1 of the first connector, and whose second terminal is connected in an electrically conductive manner to the HI1 of the first connector and of the second connector. The electronic switching unit is designed, in response to a transition of one of the at least two connectors from the mated state ($T_0$) to the first intermediate state ($T_1$), to connect at least the first terminal and the second terminal in an electrically conductive manner, or to reduce an impedance between the first terminal and the second terminal. The electronic switching unit is further designed, in response to a transition of one of the at least two connectors from the first intermediate state ($T_1'$) to the second intermediate state ($T_2$) and/or from the second intermediate state ($T_2$) to the unmated state ($T_3$), to electrically isolate the first terminal and the second terminal, or to increase an impedance between the first terminal and the second terminal.

Embodiments according to the first and/or second aspect may enable a plug-in contact device that dispenses with diodes on auxiliary contacts (for example, in a series connection). An auxiliary contact may also be referred to as a control contact. In order to be able to dispense with the diode, it is provided that the contact halves (HI1 and HI2 according to the first aspect or HI1 and HA2 according to the second aspect) are galvanically isolated in the mated state, for example by means of a partially insulated male contact (as HI1 with isolating section according to the first aspect, or HA1 with sections HI1 and TA1 according to the second aspect). Such an auxiliary contact or a connector comprising such an auxiliary contact may also be referred to as an "X conductor". The technique for preventing or suppressing an arc when disconnecting and/or closing a connector with an auxiliary contact ("X conductor") may be passed on to serially connected connectors by the plug-in contact device according to each of the above-mentioned (first and second) aspects by integrating an additional electrically conductive connection between the serial auxiliary contacts and/or to the electronic switching unit (which may also be referred to as extinguishing electronics), for example by means of an additional relay contact (which may also be referred to as a "Y contact"), into the connector. The additional relay contact is connected to the auxiliary contact in the connector and thus also to the electronic switching unit. In the extensions of the line compounds leading to the downstream connectors, additional lines (or "conductors") are provided accordingly to create a connection to the central electronic switching unit.

An extension of a line compound may comprise an extension cable. Alternatively or additionally, an extension of a line compound may comprise a wiring harness and/or lines running within a building installation and/or attached to machine lines in an industrial distribution system. For example, the "X conductor" can run within a multi-conductor cable or be run as a separate line (for example, by means of a branch behind one half of one or each connector).

An extension of a line compound may be assigned to a distribution network or an electrical installation.

Further embodiments of the plug-in contact device according to one of the aspects mentioned above are explained below. Unless explicit reference is made to the first or the second aspect, the embodiments refer to both aspects mentioned above.

The HA1 of each of the at least two connectors may comprise a male contact and the HA2 of each of the at least two connectors may comprise a female contact. Alternatively, the HA2 of each of the at least two connectors may comprise a male contact and the HA1 of each of the at least two connectors may comprise a female contact.

Alternatively or additionally, according to the first aspect, the HI1 of each of the at least two connectors may comprise a male contact and the HI2 of each of the at least two connectors may comprise a female contact. Alternatively or additionally beyond this, according to the first aspect, the HI2 of each of the at least two connectors may comprise a male contact and the HI1 of each of the at least two connectors may comprise a female contact. For example, the HI is designed so that there is no electrically conductive connection between HI1 and HI2 (for example, male contact and female contact) in the mated state (for example, a fully mated state).

Only when the DC connection is disconnected (i.e. a transition towards the unmated state) is the circuit closed via the electronic switching unit (electronics for short), preferably at the transition to the first intermediate state. This is preferably done before arcing occurs or would occur at the leading main contact (HA) without HI (according to the first aspect) or HI section (according to the second aspect), for example during the transition to the second intermediate state. The arc then triggers the electronic switching unit (electronics, for short), for example due to a voltage drop between the first and second terminals, whereupon the current is conducted via the HI or HI section and the electronics. The electronics then interrupt the circuit directly (for example, after a time period shorter than a typical time period of the transition from the second intermediate state to the unmated state), thus enabling load-free disconnection of the electrical connection (and/or load-free opening of the HI or HI section) without arcing. An exemplary mode of operation of the electronics is described in EP 2 742 565 B 1.

In a plug-in contact device having a plurality of connectors connected in parallel, also referred to as lines, embodiments of the plug-in contact device may bring about the disconnection of the individual lines from one another through electrical (preferably physical or galvanic) isolation of the respective auxiliary contacts (HI) according to the first aspect or auxiliary contact sections (HI1) according to the second aspect of the plug-in contact device in the mated state.

Herein, a state of galvanic isolation may also be referred to as an open state. A state of electrically conductive connection may also be referred to as a closed state.

In addition to the main contact (HA), as well as according to the first aspect the auxiliary contact (HI), the at least two connectors may each comprise a counter contact (GE), which may also be referred to as a second main contact, and/or a ground contact (PE, also: "physical earth"). The GE and/or the PE of each connector may each comprise a first contact half and a second contact half.

The first contact half GE1 of the GE may comprise a male contact and the second contact half GE2 of the GE may comprise a female contact. Alternatively, the GE2 may comprise a male contact and the GE1 a female contact. Alternatively or additionally, the first contact half PE1 of the PE may comprise a male contact and the second contact half PE2 of the PE may comprise a female contact, or the PE2 may comprise a male contact and the PE1 may comprise a female contact.

The main contact (HA) of the first connector may be connected or connectible to the positive pole of a DC power source. The counter contact (GE) of the first connector may be connected or connectible to the negative pole of a DC power source. The GE and/or the PE may be connected in an electrically conductive manner in the mated state ($T_0$), in the first intermediate state ($T_1$; $T_1'$) and in the second intermediate state ($T_2$) and galvanically isolated in the unmated state ($T_3$).

The electronic switching unit may comprise at least one semiconductor switch. The electronic switching unit may be connected in series to the HI (according to the first aspect) or the HI1 (according to the second aspect) of the at least two connectors. The HI or HI1 of each connector may optionally be connected in parallel to the HA of the respective connector by means of the electronic switching unit. The electronic switching unit may also be referred to as extinguishing electronics.

The electronic switching unit may further be designed, in response to a transition from the unmated state to the second intermediate state ($T_2$) and/or from the second intermediate state ($T_2$) to the first intermediate state ($T_1$; $T_1'$) of one of the at least two connectors, to connect the first terminal and the second terminal in an electrically conductive manner, or to reduce an impedance between the first terminal and the second terminal, and, in response to a transition from the first intermediate state ($T_1$; $T_1'$) to the mated state ($T_0$) of one of the at least two connectors, to electrically isolate the first terminal and the second terminal, or to increase an impedance between the first terminal and the second terminal.

The electronic switching unit may be designed to connect the first terminal and the second terminal in an electrically conductive manner for a bidirectional current flow or for both current directions. A bidirectional current flow can be ensured by a rectifier.

A pole of a DC power source of the DC connection, preferably a positive pole of the DC power source, may be connected or connectible in an electrically conductive manner to the HA1 according to the first aspect (or the LA1 of the HA1 according to the second aspect) of the main contact of the first connector and/or the first terminal of the electronic switching unit. A pole of an electrical consumer, preferably a positive pole of the consumer, may be connected or connectible in an electrically conductive manner to the HA2 of the main contact of the second connector and/or the HI2 of the auxiliary contact (according to the first aspect) of the second connector.

Alternatively or additionally, a pole of a DC power source of the DC connection, preferably a positive pole of the DC power source, may be connected or connectible in an electrically conductive manner to the HA2 of the main contact of the second connector and/or the HI2 of the auxiliary contact (according to the first aspect) of the second connector. A pole of an electrical consumer, preferably a positive pole of the consumer, may be connected or connectible in an electrically conductive manner to the HA1 according to the first aspect (or the LA1 of the HA1 according to the second aspect) of the main contact of the first connector and/or the first terminal of the electronic switching unit.

For example, the DC power source may comprise a rechargeable electrical energy storage device (preferably secondary cells) and the electrical consumer may comprise an electric machine (e-machine). The e-machine may be operated (preferably temporarily) as a generator, wherein the current direction of the direct current is reversed (preferably to a recuperation system) by the plug-in contact device.

At least the first connector may comprise a relay contact (WL) having a first contact half (WL1) and a second contact half (WL2). The WL1 of the WL of the first connector may be electrically connected to the first terminal of the electronic switching unit and/or the HI1 (according to the first and second aspects). The WL2 of the WL of the first connector may be connected to the HI1 (according to the first and second aspects) of the second connector in an electrically conductive manner. The second connector may optionally comprise a relay contact (WL) having a first contact half (WL1) and a second contact half (WL2). The WL1 of the WL of the second connector may be connected to the HI1 (according to the first and second aspects) of the second connector and/or the WL2 of the first connector in an electrically conductive manner.

The WL1 of the first or each of the at least two connectors may comprise a male contact and the WL2 of the first or each of the at least two connectors may comprise a female contact. Alternatively, the WL2 of the first or each of the at least two connectors may comprise a male contact and the WL1 of the first or each of the at least two connectors may comprise a female contact.

The electronic switching unit may be activated via the WL of the first connector when the second or a further connector is disconnected or closed by connecting the electrically conductive connection of the HI (according to the first aspect) or between HA2 and HI1 (according to the second aspect) of the second or further connector to the electronic switching unit via the WL. The electrically conductive connection of the HI or HI1, particularly if a connector remote from the electronic switching unit and connected in series is disconnected, may cause a change in the impedance of the electronic switching unit by means of a change in a potential difference between the first and second terminals of the electronic switching unit.

The WL may be designed as a signal contact, communication contact or data contact. Alternatively or additionally, the WL may comprise a coaxial contact with another contact, for example a signal contact.

An outer profile of the male contact and/or an inner profile of the female contact of the HA of each of the at least two connectors and/or an outer profile of the male contact and/or an inner profile of the female contact of the HI (according to the first aspect) of the respective connector may have a round, oval or polygonal cross-section. The HA and/or the HI (according to the first aspect) and/or the WL and/or the GE and/or the PE of the respective connector may be hermaphroditic. For example, the first contact halves HA1 and GE1 may be designed as a female contact and the first contact half PE1 as a male contact.

The electronic switching unit may comprise at least one semiconductor switch which is designed to reduce the impedance between the first terminal and the second terminal, or to connect the first terminal and the second terminal in an electrically conductive manner, when an electrical voltage is applied between the first terminal and the second terminal.

The electronic switching unit may be designed for bidirectional current flow between the first terminal and the second terminal. Preferably, the electronic switching unit for bidirectional current flow may comprise a rectifier bridge. The electronic switching unit may comprise a rectifier bridge interlinked with the at least one semiconductor switch. For example, a rectifier bridge is interlinked with one or a plurality of semiconductor switches that optionally connect and disconnect the first terminal and the second terminal in an electrically conductive manner, or optionally increase and decrease the impedance between the first terminal and the second terminal. Two opposite terminals of the rectifier bridge may comprise the first terminal and the second terminal of the electronic switching unit. Two further opposite terminals of the rectifier bridge may be connected or connectible to one another via a semiconductor switch and/or an RC element and/or a capacitor and/or a varistor and/or a thermistor.

The electronic switching unit may comprise two semiconductor switches connected in opposite directions from one another in series, each having a diode connected in parallel in the reverse direction. The respective diode connected in parallel may act as a bypass in the reverse direction of the semiconductor switch. Optionally, the electronic switching unit may further comprise a trigger circuit designed to cause a semiconductor switch to close when the electrical voltage is applied between the first terminal and the second terminal. Optionally beyond this, the trigger circuit may comprise the rectifier bridge.

Alternatively or additionally, the electronic switching unit may comprise a metal oxide semiconductor field-effect transistor (MOSFET) and/or an insulated gate bipolar transistor (IGBT) and/or an RC element comprising a capacitor and a varistor and/or thermistor.

The plug-in contact device may comprise at least two first connectors and two second connectors, each having an HA (and according to the first aspect, each having an HI) and an electronic switching unit. The first terminal of the electronic switching unit may be connected to the HA1 (according to the first aspect) or to the LA1 of the HA1 (according to the second aspect) of the HA of each first connector in an electrically conductive manner. The second terminal of the electronic switching unit may be connected to the HI1 (according to the first and second aspects) of the respective first connector in an electrically conductive manner. The respective first connector halves of the at least two first connectors may be connected to the same DC power source and/or connected in parallel.

The at least two connectors may further each comprise a counter pole contact (GE) having a first contact half (GE1) and a second contact half (GE2), for a counter pole of the DC connection with respect to the respective HA. Preferably, the GE of each connector may be designed to connect the GE1 and the GE2 in an electrically conductive manner in the mated state ($T_0$) of the respective connector, in the first intermediate state ($T_1$; $T_1'$) of the respective connector and in the second intermediate state ($T_2$) of the respective connector. The contact halves GE1 or GE2 may be longer than the contact halves HA1 (according to the first aspect) or LA1 (according to the second aspect) or HA2 of the HA. In particular, the contact half GE1 or GE2 of the GE may have the same length as a contact half HI1 or HI2 of the HI according to the first aspect and as the HI1 of the HA1 according to the second aspect.

The at least two connectors may further each comprise a ground contact (PE) having a first contact half (PE1) and a second contact half (PE2). The PE may be designed to connect the PE1 and the PE2 in an electrically conductive manner in the mated state ($T_0$) of the respective connector, in the first intermediate state ($T_1$; $T_1'$) of the respective connector and in the second intermediate state ($T_2$) of the respective connector. The contact halves PE1 or PE2 may be longer than the contact halves HA1 (according to the first aspect) or LA1 (according to the second aspect) or HA2 of the HA and/or than the contact halves HI1 or HI2 of the HI (according to the first aspect) or than the HI1 of the HA1 (according to the second aspect) and/or than the contact halves GE1 and GE2 of the GE.

Each of the at least two connectors may comprise a first connector half and a second connector half. The first connector half may comprise the HA1 of the HA (and according to the first aspect, the HI1 of the HI). The first connector half may further comprise the WL1 of the WL and/or the GE1 of the GE and/or the PE1 of the PE. The second connector half may comprise the HA2 of the HA (and according to the first aspect, the HI2 of the HI). The second connector half may further comprise the GE2 of the GE, the WL2 of the WL and/or the PE2 of the PE. The first connector half may also be referred to as a socket. The second connector half may also be referred to as a mains plug.

The first connector half and the second connector half of the respective connector may be mechanically connected in the mated state. The first connector half and the second connector half of the respective connector may be spatially isolated in the unmated state.

Each connector half may comprise a housing.

The HA (and according to the first aspect, the HI) and, optionally, the WL and/or GE and/or PE of each connector may each have a longitudinal axis. The HA1 and the HA2 (and according to the first aspect, the HI1 and the HI2) and, optionally, the WL1 and WL2 and/or the GE1 and GE2 and/or PE1 and PE2 of a connector may each be intermateable and detachable along their longitudinal axis. The longitudinal axis of the HA (and the longitudinal axis of the HI according to the first aspect), and, optionally, the longitudinal axis of the WL and/or GE and/or PE may be parallel to one another. Alternatively, the HA1 and the HA2 (and according to the first aspect, the HI1 and the HI2) and, optionally, the WL1 and the WL2 and/or the GE1 and the GE2 and/or the PE1 and PE2 may each be intermateable and detachable along a transverse axis that is transverse or perpendicular to the longitudinal axis.

An extension of the (load side) HI2 or the (DC power source side) HI1 of the HI of each of the at least two connectors according to the first aspect may, with respect to a contact point of the (DC source side) HI1 or (load side) HI2 associated with the (load side) HI2 or the (DC source side) HI1 of the respective HI, be longer than an extension of the (load side) HA2 or the (DC power source side) HA1 of the HA with respect to a contact point of the (DC power source side) HA1 or the (load side) HA2 associated with the (load side) HA2 or the (DC power source side) HA1 of the respective HA. The respective extension may be determined along the longitudinal axis in the direction of mating in the mated state. A contact half on the load side may be determined by the electrically conductive connection of HA2 and HI2. A DC power source side contact half may be determined by the series connection of HI1 (in the case of a second connector via a series connection with the WL of the associated first connector) with the electronic switching unit and its electrically conductive connection with the HA'. For example, the load side HA2 and HI2 may each comprise male contacts. The extension of the male contacts may comprise a length of the respective male contact in the (DC-side) mating direction in the mated state from the contact point of the respective female contact HA1 or HI1 (for example as the zero point). The male contact of the HA may be shorter than the male contact of the HI.

The HI2 or the HI1 of the HI of the at least one connector according to the first aspect may comprise an isolating section. In the mated state ($T_0$) of the respective connector, the isolating section may cause galvanic isolation from the contact point of the HI1 or HI2 associated with the HI2 or HI1 of the HI.

An extension of the isolating section of the HI2 or the HI1 according to the first aspect may comprise circumferential insulation running along a partial extension of the HI2 or the HI1. The partial extension of the HI2 or HI1 may be shorter than the extension of the HA2 or HA1 of the HA with respect to a contact point of the HA1 or HA2 associated with the HA2 or HA1 of the respective HA. The respective extension along the longitudinal axis may be determined in the direction of mating in the mated state. For example, the HI2 may comprise a male contact with circumferential insulation as an isolating section. The isolating section may comprise an outer partial length of the male contact (from the perspective of the mating direction).

The LA1 and the HI1 of the HA1 according to the second aspect may be arranged coaxially along the longitudinal axis. The HI1 may be arranged along the longitudinal axis in the direction of mating in front of the TA1 and the TA1 along the longitudinal axis in the direction of mating in front of the LA1 of the HA1.

The TA1 of the HA1 according to the second aspect may comprise circumferential insulation.

According to any of the preceding aspects, the HA1 or the HA2 of the respective HA may have only one contact point along the longitudinal axis. Alternatively or additionally, the HI1 or the HI2 of the respective HI may only have one contact point along the longitudinal axis.

Figure 1B:
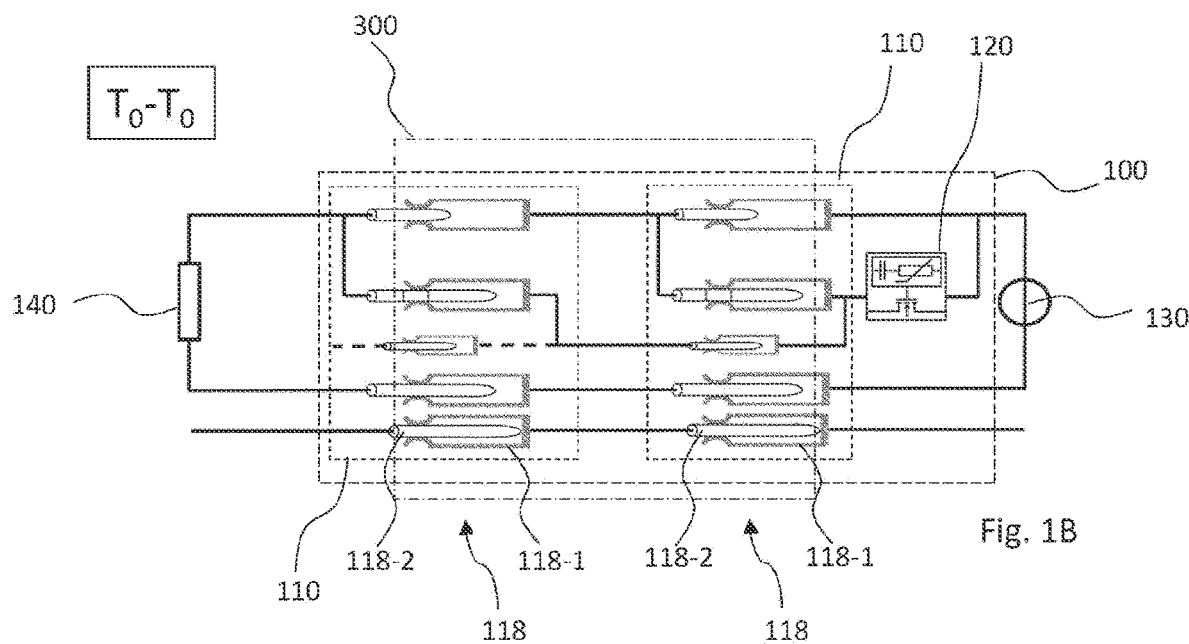

FIGS. 1A and 1B show two embodiments of a plug-in contact device, generally designated by reference numeral 100, for preventing or extinguishing an arc when a DC connection is disconnected or closed by using an extension of a line compound according to the first aspect. The plug-in contact device 100 comprises two connectors generally designated by reference numeral 110, each having a main contact (HA) 112 with a first contact half (HA1) 112-1 designed as a female contact and a second contact half (HA2) 112-2 designed as a male contact. Furthermore, each connector 110 comprises an auxiliary contact (HI) 114 having a first contact half (HI1) 114-1 designed as a female contact and a second contact half (HI2) 114-2 designed as a male contact. The HA2 112-2 and the HI2 114-2 of each connector are connected in an electrically conductive manner. The HA1 112-1 of the first connector 110 (right in the figure) is connected or connectible in an electrically conductive manner to a pole, preferably the positive pole, of a DC power source 130. The HA2 112-2 of the second connector 110 (left in the figure) is connected or connectible to a load 140. Furthermore, the HA2 112-2 and HI2 114-2 of the first connector 110 are connected in an electrically conductive manner to the HA1 112-1 of the second connector 110 by means of an extension 300 of a line compound, which is exemplarily designed here as an extension cable. The extension cable 300 comprises the second connector half 110-2 of the first connector 110, the first connector half 110-1 of the second connector 110, and their electrically conductive connections.

The first connector 110 (and optionally the second connector 110) comprises a relay contact WL 150 having a first contact half WL1 150-1 and a second contact half WL2 150-2. The first contact half WL1 150-1 of the first (and optionally the second) connector 110 is connected to the HI1 114-1 of the same connector 110 in an electrically conductive manner. The WL2 150-2 of the first connector 110 is connected to the HI1 114-1 (and optionally the WL1 150-1) of the second connector 110 in an electrically conductive manner by means of the extension cable 300. A counter-pole contact 116 of each connector 110 comprises a first contact half GE1 116-1 and a second contact half GE2 116-2, wherein the GE2 116-2 of the first connector 110 is connected to the GE1 116-1 of the second connector 110 in an electrically conductive manner by means of the extension cable 300. Furthermore, the GE1 116-1 of the first connector 110 is connected or connectible to the counter pole, preferably the negative pole, of a DC power source 130 and the GE2 116-2 of the second connector 110 is connected or connectible to a load 140.

An electronic switching unit 120 is connected in parallel to the female contact (HA1) 112-1 of the first connector 110 via a first terminal 122. The HI1 114-1 and WL1 150-1 of the first connector 110 are connected in series to the electronic switching unit 120 via a second terminal 124. The plug-in contact device 100 is shown in FIGS. 1A and 1B in the mated state T0, in which the male contacts HA2 112-2, WL2 150-2 and GE2 116-2 of each connector 110 are connected to the respective female contact HA1 112-1, WL1 150-1 and GE1 116-1 of the respective connector 110 in an electrically conductive manner via the respective contact point (113 for the HA and 115 for the HI). The male contact (HI2) 114-2 of each connector 110 is galvanically isolated from the contact point 115 of the respective female contact (HI1) 114-1 in the mated state T0 shown in FIGS. 1A and 1B by an isolating section 117, which comprises circumferential insulation.

The electronic switching unit 120 in FIGS. 1A and 1B comprises an RC element ("resistor capacitor"). The RC element may be designed as a metal oxide semiconductor field-effect transistor (MOSFET) or insulated gate bipolar transistor (IGBT). Alternatively or additionally, a plurality of RC elements, for example an IGBT and a MOSFET, may also be connected in series. Furthermore, the electronic switching unit 120 optionally comprises a rectifier bridge. By reversing the direction of the current, for example, braking energy of a generator-driven electric machine may be recuperated.

The embodiment shown in FIG. 1B further comprises, for each connector 110, a ground contact PE 118 having a first contact half PE1 118-1 designed as a female contact and a second contact half PE2 118-2 designed as a male contact. The PE2 118-2 of the first connector 110 is connected to the PE1 118-1 of the second connector 110 in an electrically conductive manner by means of the extension cable 300.

FIGS. 1A and 1B show the plug-in contact device 100 in each case in the mated state T0. The contacts HA 112, WL 150 (at least of the first connector), GE 116 and optionally PE 118 of each connector are connected in an electrically conductive manner. The contact HI 114 of each connector is galvanically isolated by means of the isolating section 117, for example circumferential insulation.

The embodiments of FIGS. 1A and 1B show how the additional forwarding contact 150 must be integrated in a connector to enable the relaying of the auxiliary contact ("X conductor") 114. In the connector 110, a connection is established with a "Y tap" from the auxiliary contact 114 to the additional relay contact 150. In the embodiments of FIGS. 1A and 1B, the "Y tap" comprises female contacts 114-1, 150-1 of the auxiliary contact 114 and the relay contact 150-1 of the first connector 110 that are electrically connected to the electronic switching unit 120. As shown in FIGS. 1A and 1B, the relay contact 150 may be smaller (for example, with respect to a cross-section and/or a longitudinal axis of the male contacts) than the main contact 112 and/or the counter contact 116 of the same connector 110. If an extension cable 300 or a device is now plugged into the connector 110, the relay contact 150 is forwarded via the male contact and the additional line ("conductor") to the auxiliary contact 114 of the downstream connector 110 (for example, from the direction of the DC power source 130). Via a corresponding "Y tap" in this downstream connector 110, the relay contact 150 may optionally also be relayed again to a downstream connector 110 (shown in dashed lines). Since the auxiliary contacts 114 of the serially arranged connectors 110 are fully mated, they are in the isolated position (i.e. the isolating section 117 is in contact with the contact point 115 of the auxiliary contact 114) and are thus electrically isolated both from the electronic control unit 120 and from other (for example serially connected) connectors 110. If one of the connectors 110 is disconnected, the corresponding auxiliary contact 114 is transferred to the conductive position and connected to the electronic control unit 120. The electronic control unit 120 then extinguishes the arc during the disconnection process of any connector connected in series 110. A special feature of the relay contact beyond this is that it may be used as a signal communication or data contact, for example, to enable communication between DC power source 130 and load 140, or to convey other information about states.

Figure 2A:
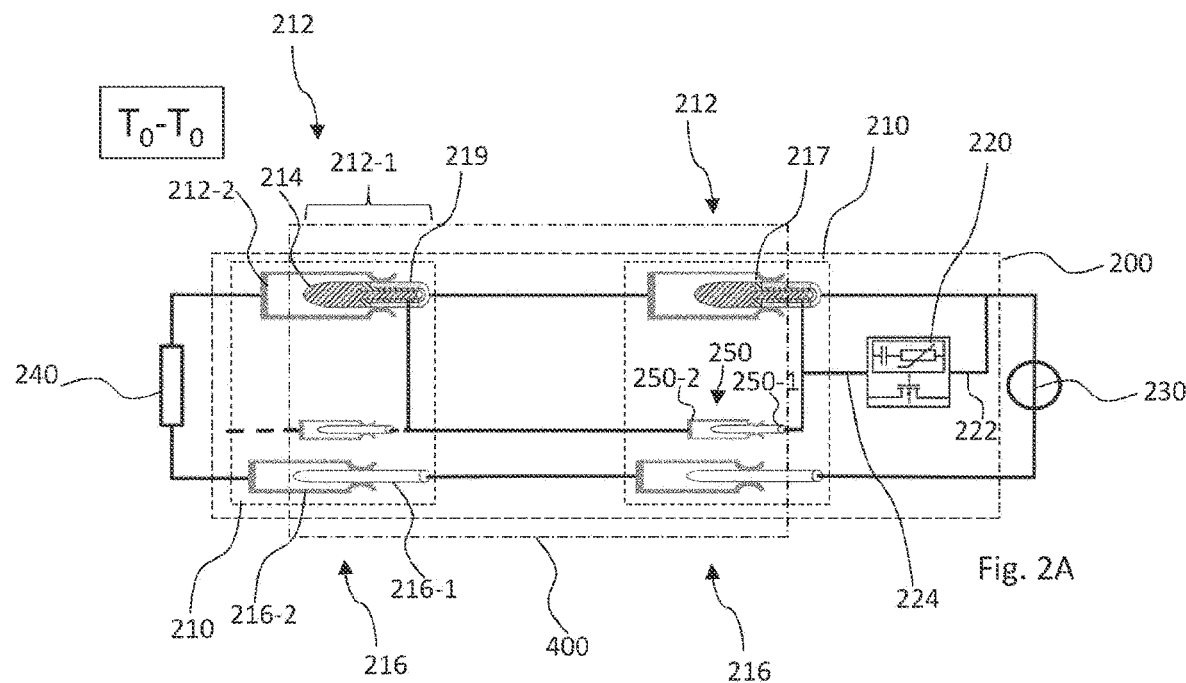
FIGS. 2A and 2B two embodiments of a plug-in contact device having a main contact, whose first contact half comprises a load contact section and an auxiliary contact section, and having an electronic switching unit and an extension of a line compound according to the second aspect.
Figure 2B:
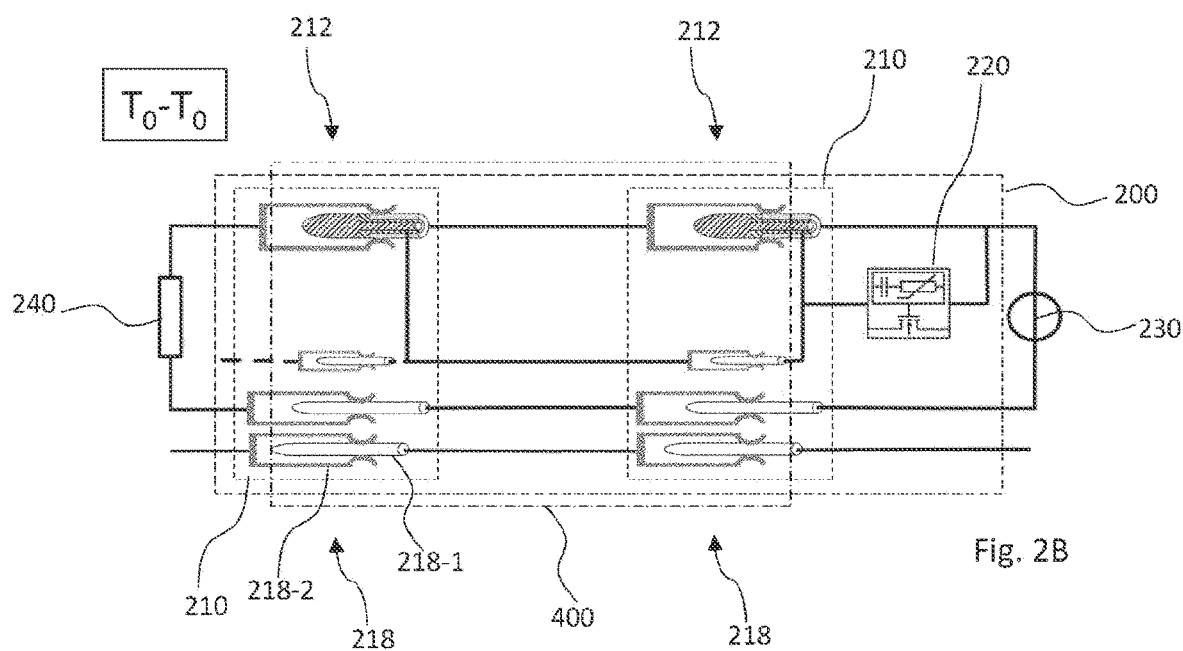

The relaying of the auxiliary contact by means of an additional relay contact works both with the contacts as shown in the embodiments of FIGS. 1A and 1B and with the use of coaxial contacts as shown in the embodiments of FIGS. 2A and 2B. Furthermore, the relay contact for relaying the auxiliary contact may also be united with another contact by means of a coaxial contact.

FIGS. 2A and 2B show two embodiments of a plug-in contact device, generally designated by reference numeral 100, for preventing or extinguishing an arc when a DC connection is disconnected or closed by using an extension of a line compound according to the second aspect. The plug-in contact device 200 comprises two connectors generally designated by reference numeral 210, each having a main contact (HA) 212 with a first contact half (HA1) 212-1 designed as a coaxial male contact and a second contact half (HA2) 212-2 designed as a female contact. The HA1 212-1 of each connector 210 comprises a load contact section (LA1) 219 and an auxiliary contact section (HI1) 214, as well as an isolating section (TA1) 217 designed as circumferential insulation. The HA1 212-1 of the respective connector 210 is designed coaxially in the mating direction along a longitudinal axis of the HA 212 with the HI1 214 in front of the circumferential TA1 217, which in turn is arranged in front of the (outward facing) LA1 219. The LA1 219 and HI1 214 of each connector 210 are galvanically isolated on an outer surface of the respective HA1 212-1 by the circumferential insulation of the associated TA1 217. Furthermore, the LA1 219 and the HI1 214 of each connector 210 are axially isolated by the same or additional insulation. The LA 219 of the HA 212 of the first connector 210 is connected or connectible to a pole, preferably the positive pole of the DC power source 230 in an electrically conductive manner. The LA 219 of the second connector 210 is connected or connectible to the associated pole of the load 240 via the contact point 213 of the HA2 212-2.

An electronic switching unit 220 is connected in parallel to the LA1 219 of the first connector 210 via the first terminal 222. The HI 214 of the first connector is connected in series to the electronic switching unit 220 via a second terminal 224. The LA1 219 of the second connector 210 is connected to the HA2 212-2 and the second contact half 250-2 of a relay contact 250 of the first connector 210 in an electrically conductive manner by means of an extension 400 of a line compound, which is exemplarily designed here as an extension cable. Optionally, the second connector 210 also comprises a relay contact 250 whose first contact half 250-1 is connected to the HA1 214 of the same connector 210 as well as to the WL2 250-2 of the first connector 210 in an electrically conductive manner.

The plug-in contact device 200 is shown in FIGS. 2A and 2B in the mated state T0 of both connectors 210, in which the LA1 219 of each male contact 212-1 is connected to the respective female contact (HA2) 212-2 in an electrically conductive manner via the associated contact point 213 and the respective HI1 214 is spatially isolated from the associated contact point 213. Each connector 210 further comprises a counter pole contact 216 having a first contact half GE1 216-1 and a second contact half 216-2. The GE1 216-1 of the first connector 210 is connected or connectible to the counter pole of the DC voltage source 230, and the GE2 216-2 of the second connector 210 to the load 240, in an electrically conductive manner. The GE2 216-2 of the first connector 210 is further connected to the GE1 216-1 of the second connector 210 by means of the extension cable 400.

A first half 210-1 of each connector 210 comprises respectively a HA1 212-1 and the GE1 216-1, and in the case of the first connector 210 (and optionally the second connector 210), respectively a WL1 250-1. A second half 210-2 of each connector 210 comprises respectively a HA2 212-2 and the GE 216-2, and in the case of the first connector 210 (and optionally the second connector 210), respectively a WL1 250-2. The GE2 216-2 of the first connector 210 is connected to the GE1 216-1 of the second connector in an electrically conductive manner by means of the extension cable 400. The extension cable 400 comprises the second half 210-2 of the first connector 210, the first half 210-1 of the second connector 210, and all electrically conductive connections between the contacts of the two connectors 210.

As shown in FIGS. 2A and 2B, each GE1 216-1 may be designed as a male contact and each GE2 216-2 as a female contact. Alternatively, each connector 210 may be hermaphroditic with a GE1 216-1 designed as a female contact and a GE2 216-2 designed as a male contact.

The embodiment shown in FIG. 2B further comprises, for each connector 210, a ground contact PE 218 having a first contact half PE1 218-1 designed as a female contact and a second contact half PE2 218-2 designed as a male contact. The PE2 218-2 of the first connector 210 is connected to the PE1 218-1 of the second connector 210 in an electrically conductive manner by means of the extension cable 400.

In the embodiments shown in FIGS. 2A and 2B, the LA1 219 of the HA1 212-1 of the first connector 210 is connected to a pole, for example the positive pole, of a DC power source 230, and the HA2 212-1 of the second connector 210 is connected to the same pole of a load 240. The GE1 216-1 of the first connector 210 is connected to the counter pole, for example the negative pole, of the DC power source 230 and the GE 216-2 of the second connector 210 is connected to the corresponding pole of the load 240. The plug-in contact device 200 is in normal operation in FIGS. 2A and 2B.

The electronic switching unit 220 in FIGS. 2A and 2B comprises an RC element ("resistor capacitor"). The RC element may be designed as a metal oxide semiconductor field-effect transistor (MOSFET) or insulated gate bipolar transistor (IGBT). Alternatively or additionally, a plurality of RC elements, for example an IGBT and a MOSFET, may also be connected in series. Optionally, the electronic switching unit further comprises a rectifier bridge which enables a bidirectional current flow in the DC system. By reversing the direction of the current, for example, braking energy of a generator-driven electric machine may be recuperated.

FIGS. 3A and 3B show the HA 112 and HI 114 of a connector 110 according to the first aspect during a disconnection process. FIG. 3A shows the HA 112 and the HI 114 of the connector 110 in a first intermediate state T1, for example when the DC connection is disconnected, in which both the HA1 112-1 and HA2 112-2, and also the HI1 114-1 and the HI2 114-2 (via the respective contact point 113 and 115) are connected in an electrically conductive manner. The electronic switching unit 120 is passive in the first intermediate state T1. In particular, the resistance of the RC element of the electronic switching unit 120 may be of high impedance in the first intermediate state T1.

FIG. 3B shows the HA 112 and the HI 114 of the connector 110 in a second intermediate state T2, in which the HA1 112-1 and the HA2 112-2 are galvanically isolated in that the HA2 112-2 is spatially isolated from the contact point 113. Arcing occurs between the HA2 112-2 and the contact point 113 of the HA1 112-1 of the connector 110. The electronic switching unit 120 is activated via the first terminal 122. Activation causes the electronic switching unit 120 (or its RC element) to become conductive. In particular, the RC element may be of low impedance in the second intermediate state T2. The HI1 114-1 and the HI2 114-2 are still connected in an electrically conductive manner via the contact point 115 in the second intermediate state T2. The direct current now flows from the DC power source 130 via the electronic switching unit 120 and the HI 114. If the second connector 110 is disconnected, the current flow is forwarded via the WL 150 of the first connector 110, which is in the mated state T0 b shown in FIGS. 1A and 1B. Preferably, the electronic switching unit 120 comprises a timer which causes the current flow via the HI 114 to be interrupted after a predetermined period of time. The current flow may be interrupted in terms of timing before a galvanic isolation of the HI 114, GE 116 and PE 118.

In an optional third intermediate state of each connector, the contacts HA 112, HI 114, WL 150 and GE 116 are galvanically isolated, while the ground contact PE 118 is still connected in an electrically conductive manner. In the unmated state T3, all contacts HA 112, HI 114, WL 150, GE 116 and PE 118 are galvanically isolated. In the unmated state T3, both contact halves 110-1 and 110-2 of the connector 110 may be spatially isolated.

FIGS. 4A to 4C show the HA 212 of a connector 210 according to the second aspect during a disconnection process. FIG. 4A shows the HA 212 of the connector 210 in a first intermediate state T1' in which the isolating section 217, which may be designed as circumferential insulation, of the HA1 212-1 is in contact with the contact point 213 of the HA2 212-2. The LA1 219 is galvanically isolated from the HA2 212-2. Arcing occurs between the LA1 219 and the contact point 213 of the HA2 212-2. The electronic switching unit 220 is activated via the first terminal 222. If the second connector 210 is disconnected, the electronic switching unit 220 is activated via the WL 250 of the first connector 210, which is in the mated state T0 shown in FIGS. 2A and 2B. Activation causes the electronic switching unit 220 (or its RC element) to become conductive. Optionally, the HI1 214 of the connector 210 is already connected to the HA2 212-2 via the contact point 213 in a conductive manner.

FIG. 4B shows the HA 212 of the connector 210 in a second intermediate state T2, in which the auxiliary contact section HI1 214 is in contact with the contact point 213 of the HA2 212-2. The TA1 217, which is designed as circumferential insulation, is located outside the female contact HA2 212-2. The HI1 214 is connected to the HA2 212-2 via the contact point 213 in an electrically conductive manner. The DC current now flows from the DC power source 230 via the electronic switching unit 220, the HI1 214 and the HA2 212-2 of the connector 210, which is in the disconnection process. Provided that the second connector 210 is disconnected, the current flow from the DC power source 230 occurs via the LA1 219 of the first connector 210, which is in the mated state T0 shown in FIGS. 2A and 2B. Preferably, the electronic switching unit 220 comprises a timer which causes the current flow via the HI1 214 and the HA2 212-2 of the connector 210 in the disconnection process to be interrupted after a predetermined period of time. The current flow may be interrupted in terms of timing before a galvanic isolation of the HI1 214 from the HA2 212-2 and/or a galvanic isolation of the GE 216 and/or PE 218 of the respective connector 210. After the current flow is interrupted, the first half 210-1 and the second half 210-2 of the connector 210 may be disconnected without arcing.

FIG. 4C shows the HA 212 of the connector 210 in the transition from the second intermediate state T2 to the unmated state T3. This transition may also be called the third intermediate state. The HI1 214 is galvanically isolated from the HA2 212-2 in this state. Furthermore, the GE 216 is galvanically isolated while the ground contact PE 218 is still connected in an electrically conductive manner. In the unmated state T3, all contacts HA 212 (both HI1 214 and LA1 219 of HA2 212-2), GE 216 and PE 118 of the connector 210 are galvanically isolated. In the unmated state T3, both contact halves 210-1 and 210-2 of the connector 210 may be spatially isolated.

In each embodiment, the auxiliary contacts 114 or the auxiliary contact section 214 are galvanically isolated in the mated state from the further contacts, in particular the main contact 112, 212 and the respective counter contact 116, 216 of the connector 110, 210. There can therefore be no short circuit in the systems. Also, a parallel arrangement of a plurality of lines is easily possible.

Figure 5:
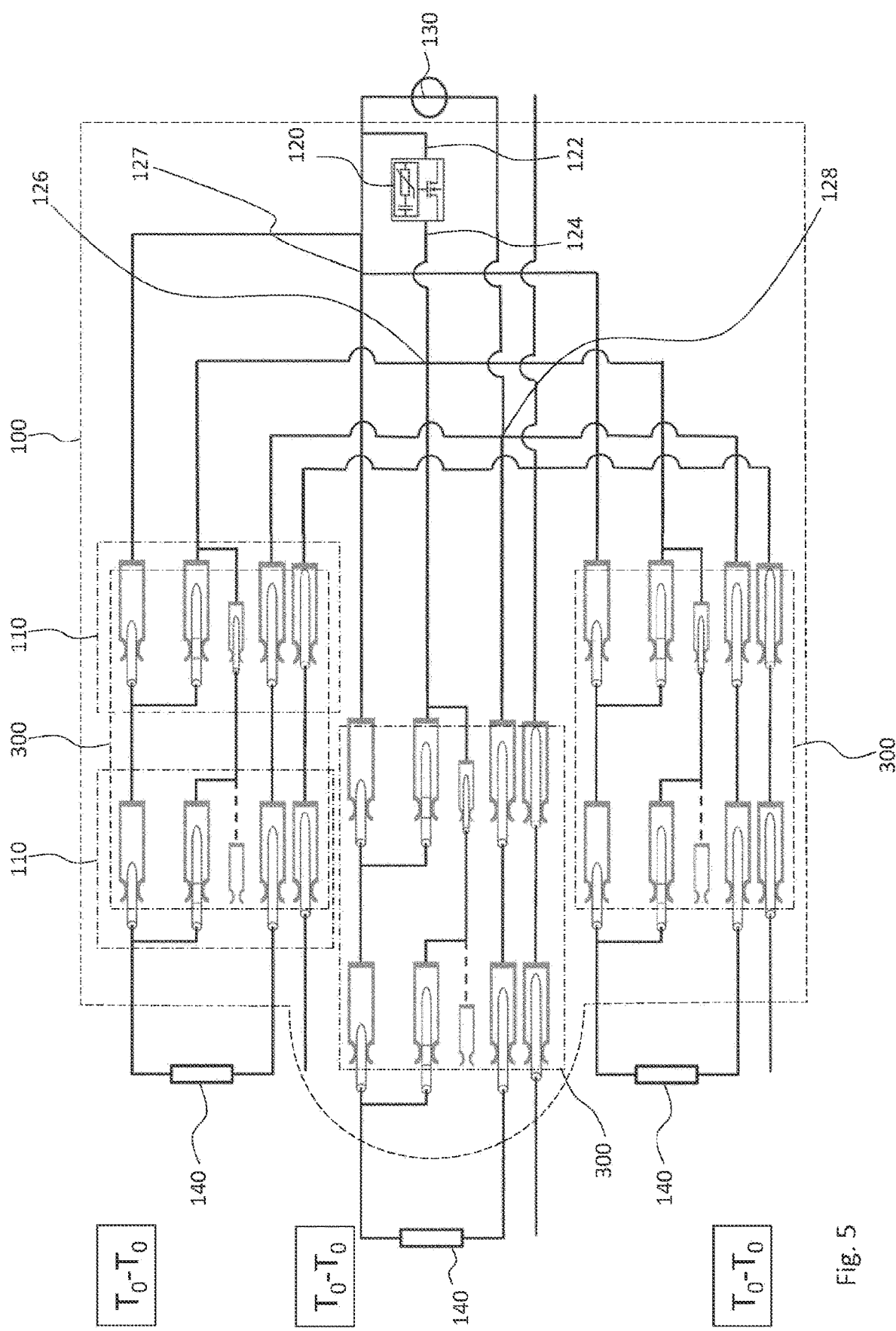
FIG. 5 a third embodiment of a plug-in contact device as a multiple plug-in system in extension of the plug-in contact device of FIG. 1B.

FIG. 5 shows a plug-in contact device 100 with three first connectors 110 and a second connector 110 connected by means of an extension 300 of a line compound, for example an extension cable. Each connector 110 and each extension cable 300 is identical in construction to the same components according to FIG. 1B and is shown in the respective mated state T0. Each HI 114 is galvanically isolated by the isolating section 117 in the mated state T0. On the DC power source 130 side, the HI 114 of all first connectors 110 are connected in parallel at point 126, so that all HI 114 of the first connectors 110 are connected to only one (common) electronic switching unit 120 in an electrically conductive manner via the second terminal 124. The (common) electronic switching unit 120 is connected to the HA 112 of all first connectors 110 connected in parallel at point 127 in an electrically conductive manner. The GE 118 of all first connectors 110 are connected in parallel at point 128.

As described with reference to FIGS. 3A and 3B, if any one of the first or second connectors 110 is disconnected, the associated HI 114 is transferred to the conductive first and second intermediate states T1 and T2 and a connection is made to the electronic switching unit 120. If one of the second connectors 110 is disconnected, the connection to the electronic switching unit 120 is made via the associated extension cable 300 and the WL 150 of the associated first connector 110.

By means of the plug-in contact device 100, in particular by means of the isolating section 117 of the auxiliary contact HI 114 and the connection by means of the relay contact 150 according to the first aspect (or by means of the isolating section 217 between the load contact section 214 and the auxiliary contact section 219 according to the second aspect) when using an extension cable 300 (or 400), further components, in particular diodes in or on the first contact half HI1 114-1 or the auxiliary contact section 214, can be avoided.

The connectors 110 in the other (mated) lines are not affected by the disconnection of any one connector 110 and the resulting arc in the associated HA 112 and current flow in the associated HI 114, as their respective HI 114s remain galvanically isolated from the (common) electronic switching unit 120. In normal operation, there is therefore no short circuit between different lines, even if extension cables are used. A problem analogous to that described in patent specification EP 2 742 565 B1 only exists if more than one connector 110 in different lines can be simultaneously disconnected. If two (or more) connectors 110 in different lines are disconnected at the same time, a short circuit may occur between these two (or more) lines.

A further embodiment (without figure) comprises a multiple plug-in system with connectors 210 and extensions 400 of line compounds according to the second aspect.

The multiple plug-in system (shown, for example, in the embodiment in FIG. 5) can be scaled up to building installation level. The electronic switching unit (for example the switching unit 120) is accordingly not integrated in a multiple plug-in system, but for example centrally in a sub-distribution of a room or a floor. Therefore, the described auxiliary contact (for example HI 114) must be connected to the electronic switching unit (for example switching unit 120) via an additional line. Since this is not a control line or a signal line, this connection may also be referred to as "X conductor".

Figure 6A:
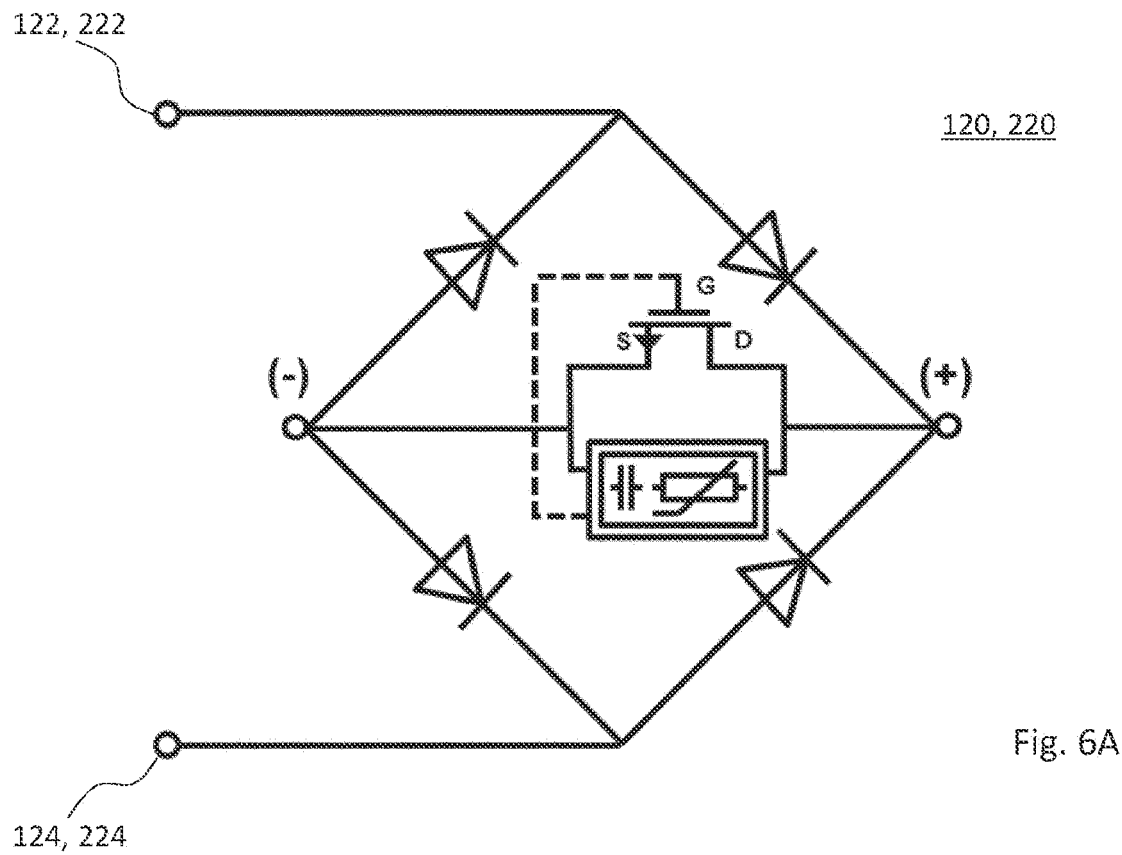
FIGS. 6A and 6B two embodiments of a bidirectional electronic switching unit.
Figure 6B:
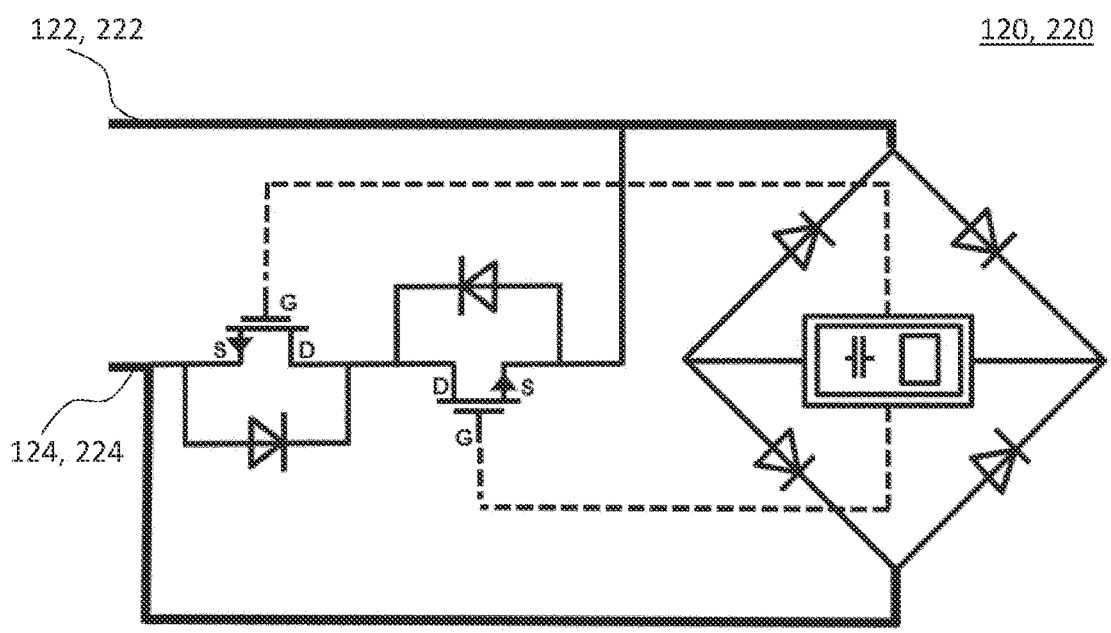

FIGS. 6A and 6B show two embodiments of a bidirectional electronic switching unit 120, 220 comprising a rectifier bridge. The rectifier bridge is connectible to the HA1 112-1 or the LA1 219 via a first terminal 122, 222 and to the HI1 114-1, 214 via a second terminal 124, 224.

The two further (inner) terminals of the rectifier bridge are connected to one another in the embodiment shown in FIG. 6A via a parallel circuit of a semiconductor switch and an RC element with variable resistance, wherein the impedance of the semiconductor switch may be changed by means of a control signal (illustrated in dashed lines). Independent of a polarity applied externally (at the first and second terminals), a specific polarity is ensured at the (two further) inner terminals via the diodes of the rectifier bridge and a bidirectional current flow is enabled via the HA 112 (or the HA2 212-2 and the LA1 219) and the HI 114 (or the HA2 212-2 and the HI1 214).

In the embodiment shown in FIG. 6B, the electronic switching unit 120, 220 comprises reverse polarity protection comprising two semiconductor switches connected in opposite directions in series and a diode connected in parallel in the reverse direction in each case (left in FIG. 6B). The respective diode connected in parallel acts as a bypass in the reverse direction of the semiconductor switch. Furthermore, the electronic switching unit 120, 220 in FIG. 6B comprises a trigger circuit connecting the two further (inner) terminals of the rectifier bridge (right in FIG. 6B). Depending on an externally applied polarity, the trigger circuit changes (e.g. decreases) the impedance of one or both of the two semiconductor switches connected in series by means of control signals (shown in dashed lines). Alternatively, a unipolar semiconductor switch may also be used.

Extending the supply line to the electronic switching unit (e.g. switching unit 120) may still be possible. However, in the prior art, for example in patent specification EP 2 742 565 B1, each connector (for example, consisting of a socket unit on the DC power source side and a plug unit on the load side) must be equipped with a diode, either in the connector, or at least somewhere in the auxiliary line (designed as a control line). In the plug-in contact device according to the invention (for example the plug-in contact device 100) these diodes are replaced by safe galvanic isolation of the auxiliary contacts (for example the HI 114) or auxiliary contact sections by means of an isolating section (for example the isolating section 117), which, in the mated state, isolates the metallic contact partners of the male contact and female contact from one another. The design in the form of a round pin and round socket is only exemplary. Such an isolator may also be used for hermaphroditic contacts or flat contacts. Since in the mated state, for example, the auxiliary contacts (for example, HI 114) of all connectors (for example, connectors 110) according to the first aspect are in the standby position on the respective isolating section (for example, the isolating section 117) of the auxiliary contacts, a short circuit between different connectors can therefore also not occur. Similarly, according to the second aspect, the HI1 214 is galvanically isolated from the HA2 212-2 in the standby position. A conductive connection to the electronic switching unit (e.g. the switching unit 120) is only made when a connector is disconnected.

For each of the at least two connectors, the embodiments of FIGS. 1A and 1B, FIGS. 3A and 3B, and FIG. 5 according to the first aspect comprise female contacts as HA1 112-1, HI1 114-1, WL1 150-1, GE1 116-1, and optionally PE1 118-1, and male contacts as HA2 112-2, HI 112-2, WL2 150-2, GE2 116-2, and optionally PE2 118-2. Further embodiments correspond to the interchanging of male contacts and female contacts. Furthermore, any hermaphroditic combinations of the connector halves are possible.

For each of the at least two connectors, the embodiments of FIGS. 2A and 2B and FIGS. 4A to 4C according to the second aspect comprise male contacts as HA1 212-1, WL1 250-1, GE1 216-1, and optionally PE1 218-1, and female contacts as HA2 212-2, WL2 250-2, GE2 216-2, and optionally PE2 218-2. Further embodiments correspond to the interchanging of male contacts and female contacts. Furthermore, any hermaphroditic combinations of the connector halves are possible.

Furthermore, the extensions 300, 400 of line compounds are shown in FIGS. 1A to 5 with respective intermateable halves of the first and second connectors 110, 210. Further possible embodiments of a plug-in contact device comprise at least one extension of a line compound comprising, at a first end, one half of a connector according to the first aspect and, at a second end, one half of a connector according to the first aspect. Alternatively or additionally, an extension of a line compound may comprise two different connector halves according to the same (first or second) aspect at the two ends. The first end may optionally correspond to the DC power source side end or the load side end of the extension (e.g. designed as an extension cable) of a line compound. Such an extension cable may also be referred to as an adapter cable (for example between two connector systems).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

Plug-in contact device 100, 200
Connector 110, 210
First connector half 110-1, 210-1
Second connector half 110-2, 210-2
Main contact (HA) 112, 212
First contact half of the main contact (HA1) 112-1, 212-1
Second contact half of the main contact (HA2) 112-2, 212-2
Contact point of the main contact 113, 213
Auxiliary contact (HI) 114
First contact half of the auxiliary contact (HI1) 114-1
Second contact half of the auxiliary contact (HI2) 114-2
Contact point of the auxiliary contact 115
Counter pole contact (GE) 116, 216
First contact half of the counter pole contact (GE1) 116-1, 216-1
Second contact half of the counter pole contact (GE2) 116-2, 216-2
Isolating section of the auxiliary contact 117
Ground contact (PE) 118, 218
First contact half of the ground contact (PE1) 118-1, 218-1
Second contact half of the ground contact (PE2) 118-2, 218-2
Electronic switching unit 120, 220
First terminal 122, 222
Second terminal 124, 224
Parallel circuit of auxiliary contacts 126
Parallel circuit of main contacts 127
Parallel circuit of counter pole contacts 128
DC power source 130, 230
Load 140, 240
Relay contact (WL) 150, 250
First contact half of the relay contact (WL1) 150-1, 250-1
Second contact half of the relay contact (WL2) 150-2, 250-2
First auxiliary contact section (HI1) 214
Load contact section (LA1) 219
Isolating section (TA1) 217
Extension cable 300, 400
Mated state T0
First intermediate state T1, T1'
Second intermediate state T2
Unmated state T3

The invention claimed is:

1. A plug-in contact device for preventing or extinguishing an arc when a DC connection is disconnected or closed by using an extension of a line compound, comprising:
at least two connectors at ends of an extension of a line compound, each having a main contact (HA) and an auxiliary contact (HI), the HA of each of the at least two connectors comprising a first contact half (HA1) and a second contact half (HA2), which are detachably intermateable, the HA being configured to:
  connect the HA1 and the HA2 in an electrically conductive manner in a mated state of the respective connector,
  galvanically isolate the HA1 and the HA2 in an unmated state of the respective connector,
  connect the HA1 and the HA2 in an electrically conductive manner in a first intermediate state of the respective connector between the mated state and the unmated state, and
  galvanically isolate the HA1 and the HA2 in a second intermediate state of the respective connector between the first intermediate state and the unmated state,
wherein the auxiliary contact HI of each of the at least two connectors comprises a first contact half (HI1) and a second contact half (HI2), which are detachably intermateable, the HI being configured to:

galvanically isolate the HI1 and the HI2 in the mated state of the respective connector, galvanically isolate the HI1 and the HI2 in the unmated state of the respective connector, connect the HI1 and the HI2 in an electrically conductive manner in the first intermediate state of the respective connector, and connect the HI1 and the HI2 in an electrically conductive manner in the second intermediate state of the respective connector, wherein the HA2 and the HI2 of the respective connector are connected in an electrically conductive manner, wherein the HA2 of a first connector is connected to the HA1 of a second connector in an electrically conductive manner, further comprising an electronic switching unit, whose first terminal is connected in an electrically conductive manner to the HA1 of the first connector, and whose second terminal is connected in an electrically conductive manner to the HI1 of the first connector and of the second connector, wherein the electronic switching unit is configured, in response to a transition from the mated state to the first intermediate state of at least one of the connectors, to connect the first terminal and the second terminal in an electrically conductive manner, or to reduce an impedance between the first terminal and the second terminal, and, in response to a transition from the first intermediate state to the second intermediate state of at least one of the connectors and/or from the second intermediate state to the unmated state of at least one of the connectors, to electrically isolate the first terminal and the second terminal, or to increase an impedance between the first terminal and the second terminal.

2. A plug-in contact device for preventing or extinguishing an arc when a DC connection is disconnected or closed by using an extension of a line compound, comprising:

at least two connectors at ends of an extension of a line compound, each having a main contact (HA), the HA comprising a first contact half (HA1) and a second contact half (HA2), which are detachably intermateable, the HA1 comprising a load contact section (LA1), an isolating section (TA1), and an auxiliary contact section (HI1), the HA of each of the at least two connectors being configured to:

connect the LA1 and the HA2 in an electrically conductive manner in a mated state of the respective connector and to galvanically isolate the HI1 from the HA2, galvanically isolate the LA1 and the HI1 from the HA2 in an unmated state of the respective connector, in a first intermediate state of the respective connector between the mated state and the unmated state, galvanically isolate the LA1 and the HA2 and to bring at least the TAI into contact with one contact point of the HA2, and in a second intermediate stateof the respective connector between the first intermediate state and the unmated state, connect the HI1 to the HA2 in an electrically conductive manner and to galvanically isolate the LA1 and the HA2, wherein the HA2 of a first connector is connected to the HA1 of a second connector in an electrically conductive manner and further comprising an electronic switching unit, whose first terminal is connected in an electrically conductive manner to the LA1 of the first connector, and whose second terminal is connected in an electrically conductive manner to the HI1 of the first connector and of the second connector, wherein the electronic switching unit is configured, in response to a transition from the mated state to the first intermediate state, to connect the first terminal and the second terminal in an electrically conductive manner, or to reduce an impedance between the first terminal and the second terminal, and, in response to a transition from the first intermediate state to the second intermediate state and/or from the second intermediate state to the unmated state, to electrically isolate the first terminal and the second terminal, or to increase an impedance between the first terminal and the second terminal.

3. The plug-in contact device of claim 1, wherein the electronic switching unit is configured, in response to a transition from the unmated state to the second intermediate state and/or from the second intermediate state to the first intermediate state of one of the at least two connectors, to connect the first terminal and the second terminal in an electrically conductive manner, or to reduce an impedance between the first terminal and the second terminal, and, in response to a transition from the first intermediate state to the mated state of one of the at least two connectors, to electrically isolate the first terminal and the second terminal, or to increase an impedance between the first terminal and the second terminal.

4. The plug-in contact device of claim 1, wherein a pole of a DC power source of the DC connection is connected or connectible in an electrically conductive manner to the HA1 or the LA1 of the main contact of the first connector and/or the first terminal of the electronic switching unit, and wherein a pole of an electrical consumer is connected or connectible in an electrically conductive manner to the HA2 of the main contact of the second connector and/or the HI2 of the auxiliary contact of the second connector, and/or wherein a pole of a DC power source of the DC connection is connected or connectible in an electrically conductive manner to the HA2 of the main contact of the second connector and/or the HI2 of the auxiliary contact of the second connector, and wherein a pole of an electrical consumer is connected or connectible in an electrically conductive manner to the HA1 or the LA of the main contact of the first connector and/or the first terminal of the electronic switching unit.

5. The plug-in contact device of claim 1, wherein at least the first connector comprises a relay contact (WL) having a first contact half (WL1) and a second contact half (WL2), the WLI of the WL of the first connector being electrically connected to the first terminal of the electronic switching unit and/or the HI1, and the WL2 of the WL of the first connector being connected to the HI1 of the second connector in an electrically conductive manner.

6. The plug-in contact device of claim 1, wherein the HA1 of each of the at least two connectors comprises a male contact and the HA2 of each of the at least two connectors comprises a female contact, or wherein the HA2 of each of the at least two connectors comprises a male contact and the HA1 of each of the at least two connectors comprises a female contact; and/or wherein the first contact half (HI1) of the auxiliary contact of each of the at least two connectors comprises a male contact and the second contact half (HI2) of the auxiliary contact of each of the at least two connectors comprises a female contact, or wherein the second contact half (HI2) of the auxiliary contact of each of the at least two connectors comprises a male contact and the first contact half (HI1) of the auxiliary contact of each of the at least two connectors comprises a female contact.

7. The plug-in contact device of claim 6, wherein an outer profile of the male contact and/or an inner profile of the female contact of the HA of each of the at least two connectors and/or an outer profile of the male contact and/or an inner profile of the female contact of the auxiliary contact (HI) of the respective connector has a round, oval or polygonal cross-section, and/or
wherein the HA and/or the auxiliary contact (HI) and/or a relay contact (WL) of the respective connector are hermaphroditic.

8. The plug-in contact device of claim 1, wherein the electronic switching unit is configured for bidirectional current flow between the first terminal and the second terminal.

9. The plug-in contact device of claim 8, wherein the electronic switching unit comprises at least one semiconductor switch configured to reduce the impedance between the first terminal and the second terminal, or to connect the first terminal and the second terminal in an electrically conductive manner, when an electrical voltage is applied between the first terminal and the second terminal.

10. The plug-in contact device of claim 9, wherein the electronic switching unit comprises a rectifier bridge interlinked with the at least one semiconductor switch.

11. The plug-in contact device of claim 10, wherein the electronic switching unit comprises two semiconductor switches connected in opposite directions from one another in series and to each of which a diode is connected in parallel in the reverse direction.

12. The plug-in contact device of claim 1, further comprising:
at least two first connectors and two second connectors each having an HA and/or an HI and an electronic switching unit,
wherein the first terminal of the electronic switching unit is connected to the HA1 or to the LA1 of the HA of each first connector in an electrically conductive manner and the second terminal of the electronic switching unit is connected to the HI1 of the respective first connector in an electrically conductive manner.

13. The plug-in contact device of claim 1, wherein the at least two connectors further each comprise a counter pole contact (GE) having a first contact half (GE1) and a second contact half (GE2) for a counter pole of the DC connection with respect to the respective HA.

14. The plug-in contact device of claim 1, wherein the at least two connectors further each comprise a ground contact (PE) having a first contact half (PE1) and a second contact half (PE2), and
wherein the PE is configured to connect the PE1 and the PE2 in an electrically conductive manner in the mated state of the respective connector, in the first intermediate state of the respective connector and in the second intermediate state of the respective connector.

15. The plug-in contact device of claim 13, wherein the at least one connector comprises a first connector half and a second connector half, and
wherein the first connector half comprises the HA1 of the HA as well as the GE1 of the GE and/or the PE1 of the PE and the second connector half comprises the HA2 of the HA as well as the GE2 of the GE and/or the PE2 of the PE.

16. The plug-in contact device of claim 5, wherein the HA and/or the HI and/or the relay contact (WL), each have a longitudinal axis,
wherein the HA1 and the HA2 and/or the HI1 and the HI2 and/or the first and second contact halves (WL1 and WL2) of the WL are each intermateable and detachable along their longitudinal axis, or wherein the HA1 and the HA2 and/or the contact halves HI1 and HI2 of the auxiliary contact and/or the contact halves (WL1 and WL2) of the relay contact (WL) are each intermateable and detachable along a transverse axis that is transverse or perpendicular to the longitudinal axis.

17. The plug-in contact device of claim 1, wherein an extension of the HI2 or the HI1 of the HI of each of the at least two connectors with respect to a contact point of the HI1 or the HI2 respectively, which is associated with the HI2 or the HI1 of the respective HI, is longer than an extension of the HA2 or the HA1 of the HA with respect to a contact point of the HA1 or the HA2, which is associated with the HA2 or the HA1 of the respective HA, and
wherein the respective extension along the longitudinal axis is determined in the direction of mating in the mated state.

18. The plug-in contact device of claim 17, wherein the HI2 or the HI1 of the HI of the at least one connector comprises an isolating section, and
wherein the isolating section, in the mated state of the respective connector, is configured to cause galvanic isolation from the contact point of the HI1 or the HI2 associated with the HI2 or the HI1 of the HI.

19. The plug-in contact device of claim 18, wherein an extension of the isolating section of the HI2 or the HI1 comprises circumferential insulation running along a partial extension of the HI2 or the HI1,
wherein the partial extension of the HI2 or the HI1 is shorter than the extension of the HA2 or the HA1 of the HA with respect to a contact point of the HA1 or HA2, which is associated with the HA2 or the HA1 of the respective HA, and
wherein the respective extension along the longitudinal axis is determined in the direction of mating in the mated state.

20. The plug-in contact device of claim 16, wherein the LA1 and the HI1 of the HA1 are arranged coaxially along the longitudinal axis, and
wherein the HI1 is arranged along the longitudinal axis in the direction of mating in front of the TA1, and the TAI is arranged along the longitudinal axis in the direction of mating in front of the LA1 of the HA1.

21. The plug-in contact device of claim 16, wherein the TAI of the HA1 comprises circumferential insulation.

22. The plug-in contact device of claim 16, wherein the HA1 or the HA2 of the respective HA has only one contact point along the longitudinal axis and/or the first contact half, HI1, or the second contact half, HI2, of the respective auxiliary contact, HI, has only one contact point along the longitudinal axis.

* * * * *